Figure 9:
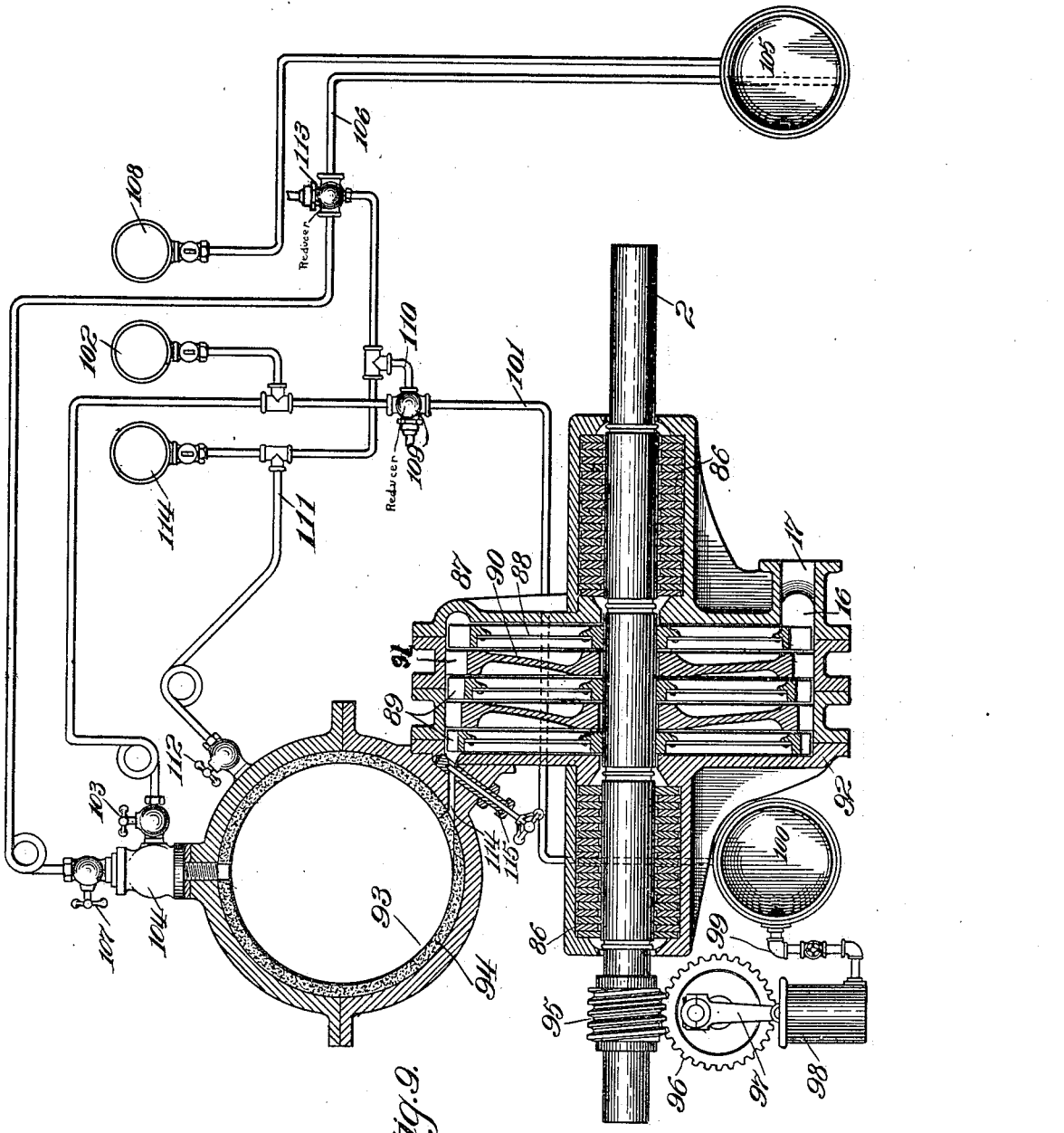

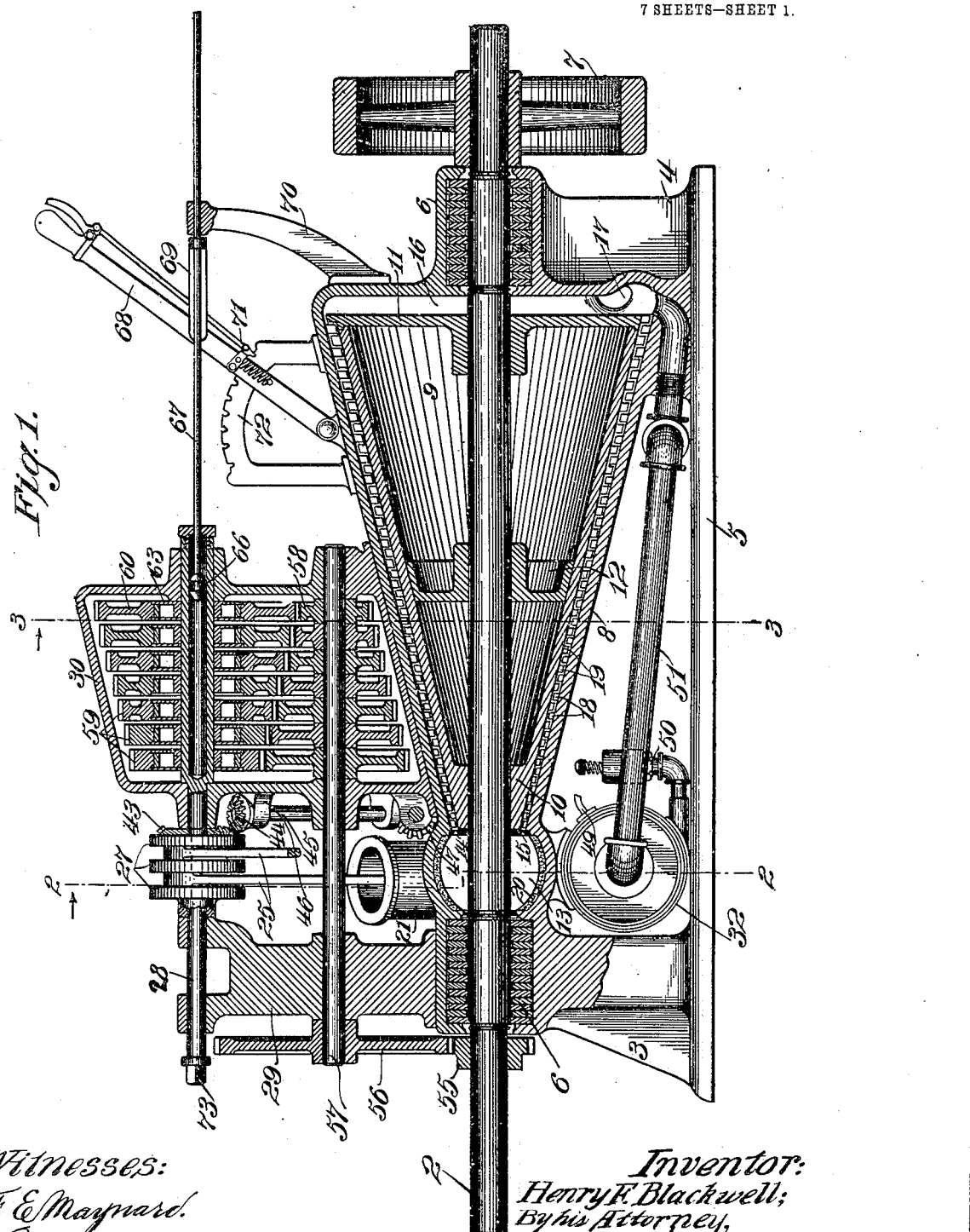

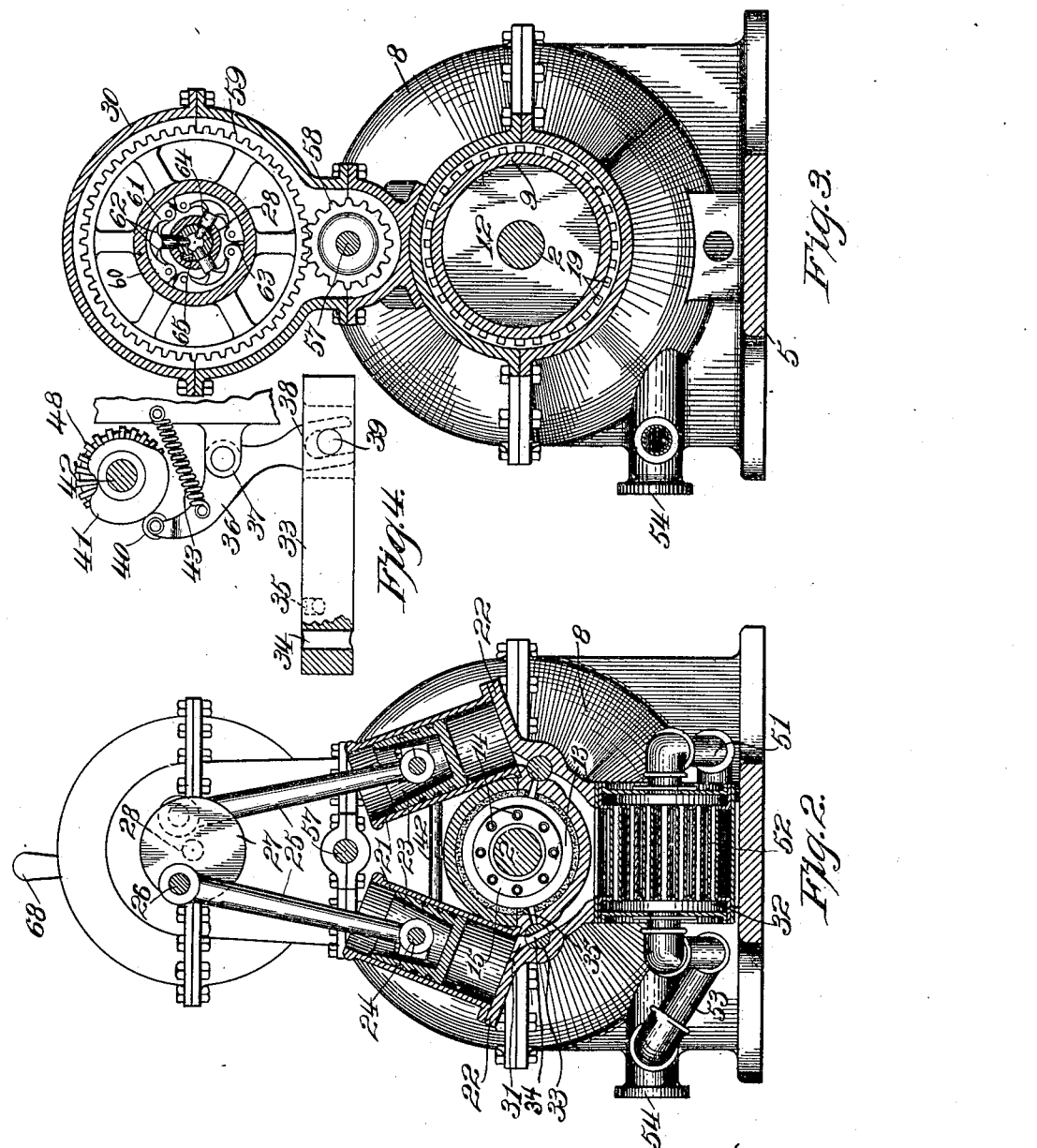

No. 819,202.　　　　　　　　　　　　　PATENTED MAY 1, 1906.
H. F. BLACKWELL.
GAS TURBINE OPERATING SYSTEM.
APPLICATION FILED MAR. 14, 1904.
7 SHEETS—SHEET 3.
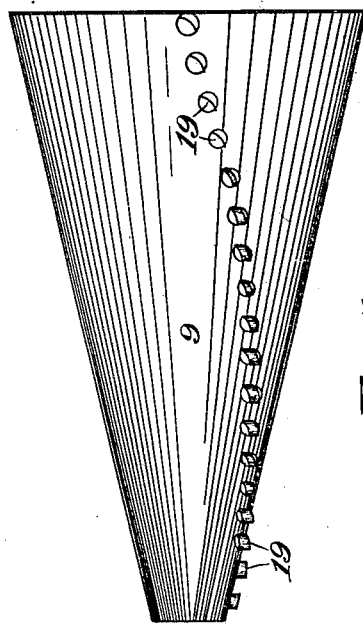
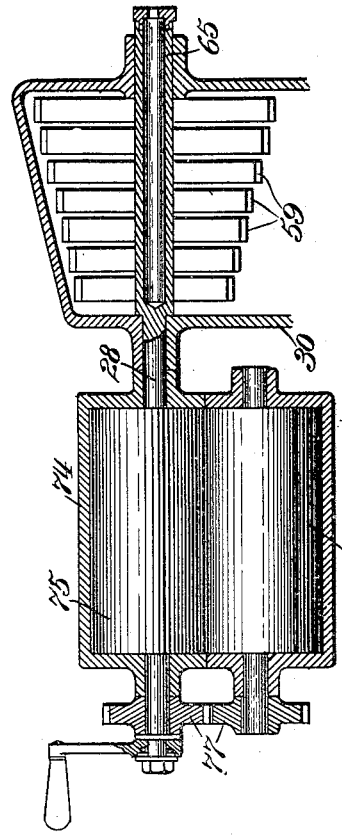
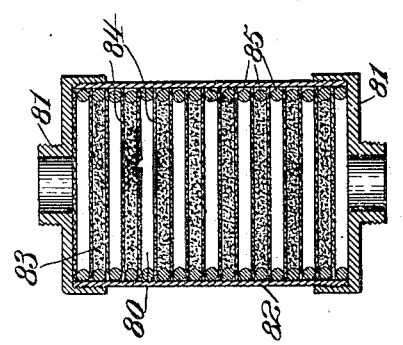
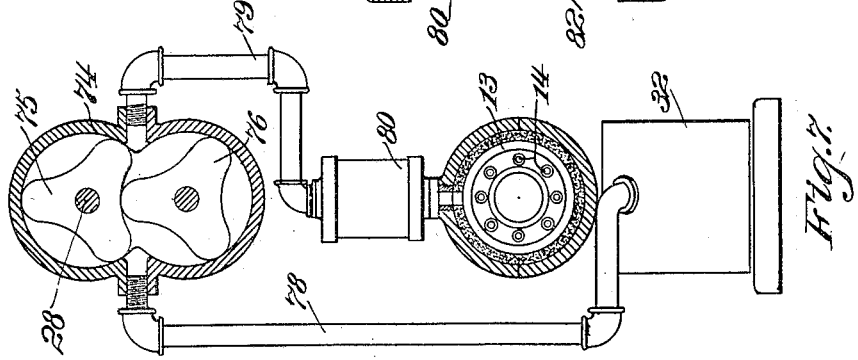
Witnesses:
Fred E. Maynard.
R. W. Pittman
Inventor:
Henry F. Blackwell,
By his Attorney,
F. H. Richards.

No. 819,202. PATENTED MAY 1, 1906.
H. F. BLACKWELL.
GAS TURBINE OPERATING SYSTEM.
APPLICATION FILED MAR. 14, 1904.

7 SHEETS—SHEET 4.

Witnesses:
F. E. Maynard,
P. W. Pittman

Inventor:
Henry F. Blackwell;
By his Attorney
F. H. Richards.

No. 819,202. PATENTED MAY 1, 1906.
H. F. BLACKWELL.
GAS TURBINE OPERATING SYSTEM.
APPLICATION FILED MAR. 14, 1904.

7 SHEETS—SHEET 6.

Witnesses:
Fred E. Maynard
R. W. Pittman

Inventor:
Henry F. Blackwell;
By his Attorney
F. H. Richards.

No. 819,202. PATENTED MAY 1, 1906.
H. F. BLACKWELL.
GAS TURBINE OPERATING SYSTEM.
APPLICATION FILED MAR. 14, 1904.
7 SHEETS—SHEET 7.
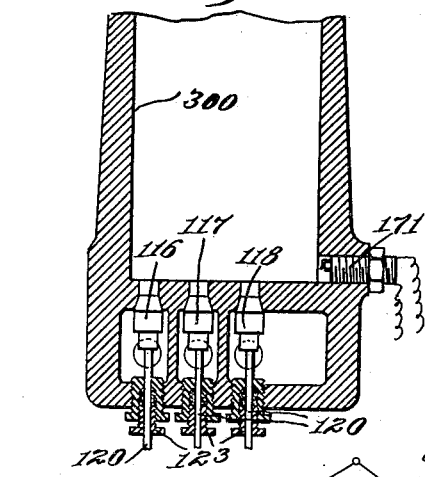
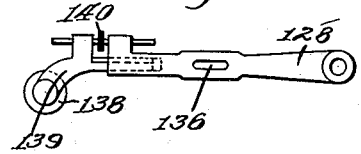
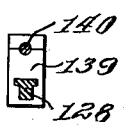
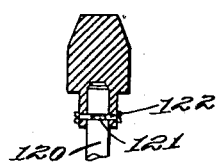
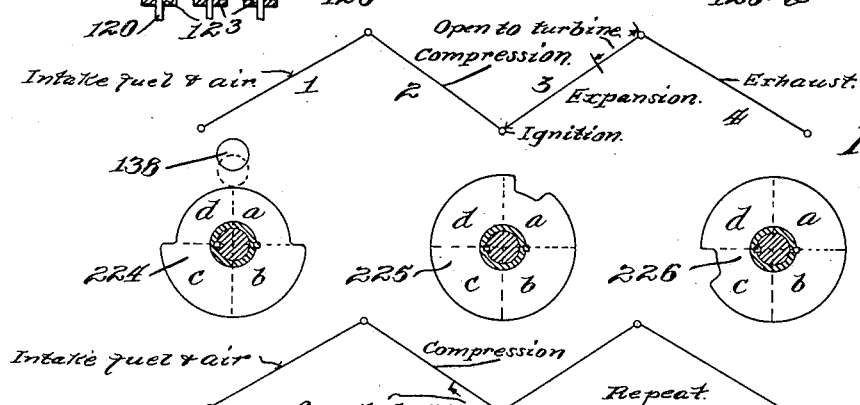
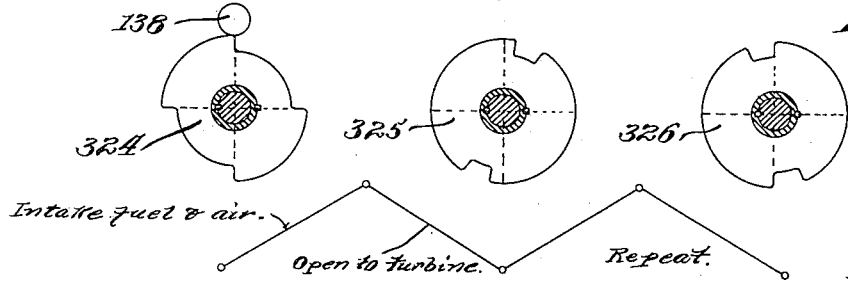
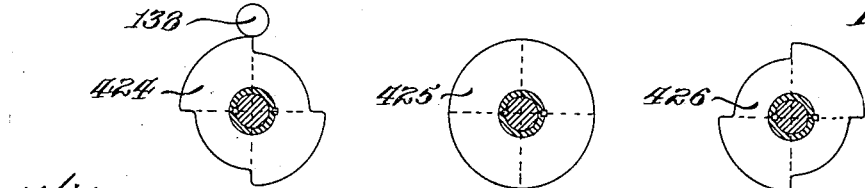
Witnesses:
Inventor:
Henry F. Blackwell,
By his Attorney,
F. H. Richards

UNITED STATES PATENT OFFICE.

HENRY F. BLACKWELL, OF NEW YORK, N. Y.

GAS TURBINE-OPERATING SYSTEM.

No. 819,202.   Specification of Letters Patent.   Patented May 1, 1906.

Application filed March 14, 1904. Serial No. 198,092.

*To all whom it may concern:*

Be it known that I, HENRY F. BLACKWELL, a citizen of the United States, residing in New York, Manhattan borough, in the county of New York and State of New York, have invented certain new and useful Improvements in Gas Turbine-Operating Systems, of which the following is a specification.

The present invention pertains to an organization of devices designed for the conversion into power of the high velocity of discharge through small orifices of the products of combustion of a suitable fuel. Such results I accomplish by the action and reaction exerted by the moving products of combustion against wings or projections, some of which are upon a rotatable body, and which movable projections, in conjunction with fixed elements of the same character, constitute the translating device of the organization.

The combustion of the fuel may be effected by a suitable ignition device—such, for instance, as any of those well known in the arts. The heat of the combustion-chamber itself, to which the combustible mixture is admitted under compression, may also be used for that purpose, and, if desired, the mixture may be compressed to the point of ignition and the burning gas admitted to the combustion-chamber, this latter method being particularly applicable where the gas mixture is a slow-burning one.

With respect to that feature of the present organization which constitutes the translating device thereof I contemplate the employment of either the radial or parallel flow type of turbine, such motors by a suitable adaptation of construction to the greatly higher temperatures met with being rendered available to the utilization of the products of combustion of a combustible mixture as a motive fluid.

While I do not intend limiting the practice of the present invention to any specific type or construction of turbine, I have as one of the elements of one embodiment of the present organization illustrated a novel type of such motor, the same comprising a conical casing or fixed element and a similar rotary element, between which two there is a space gradually increasing in width from the point of admission to the point of exhaust. Projecting from the interior conical surface of the casing and from the exterior conical surface of the conical rotary element are suitable wings or projections disposed at the proper angle to effect, through the medium of the motive fluid, a maximum torque upon the movable element.

Suitable means are provided for compressing the mixed fuel and air, and in one modification of the organization a plurality of interconvertible compressors and engines are illustrated, each of which by a proper manipulation of the controlling mechanism may be run as an engine or as a compressor, and inasmuch as each of such devices is at will convertible from one to the other any desired combination may be made—that is to say, one or more may operate as engines, while the others are being used as compressors or are running light—such engine or engines being available for initiating or starting in motion the moving part of the motor, after which the power-transmitting part of the organization can be connected with the latter.

These various features, combined with others comprised in the present invention, are illustrated in the drawings accompanying the present specification, in which drawings there are shown embodiments of the invention.

Figure 10:
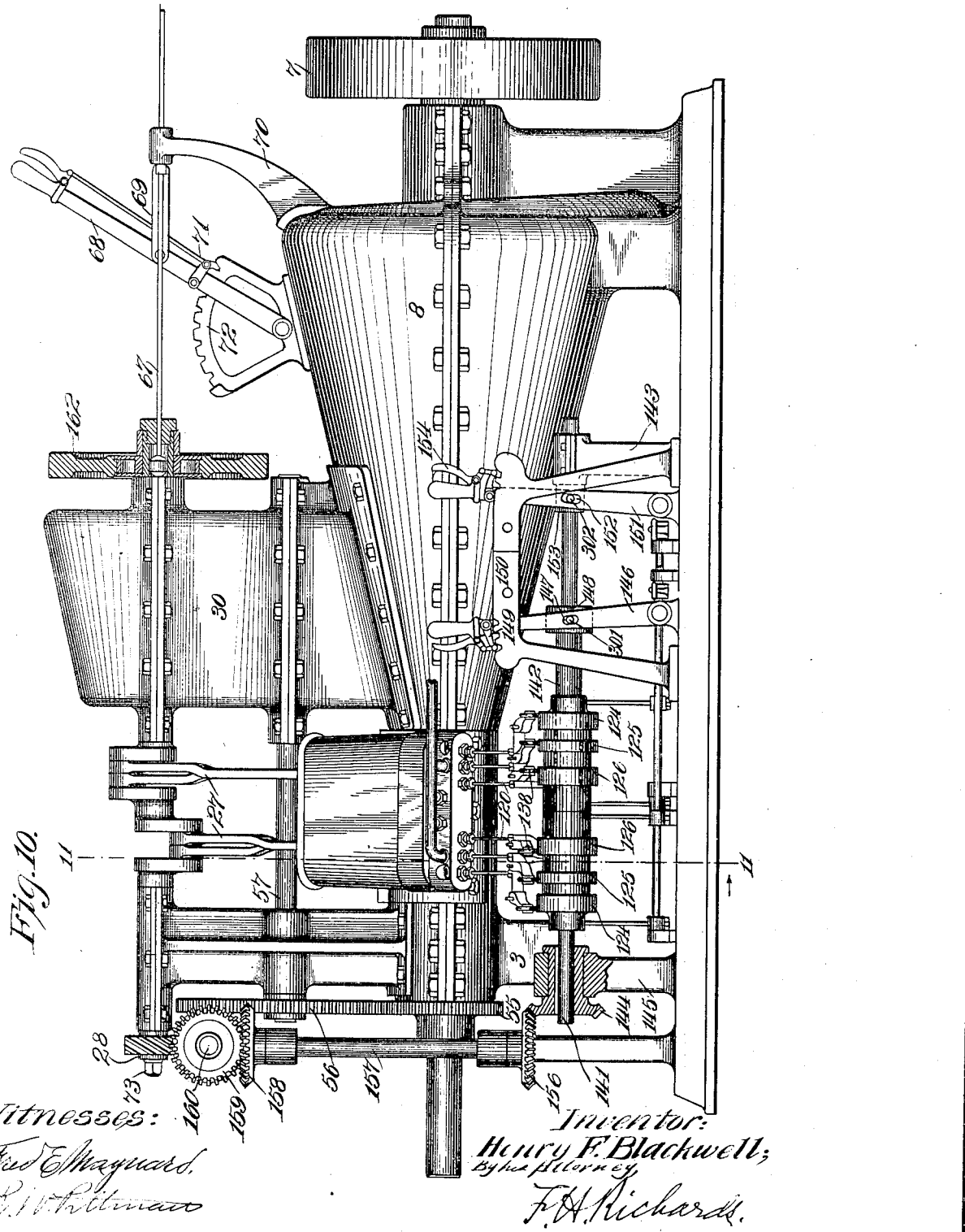
Figure 11:
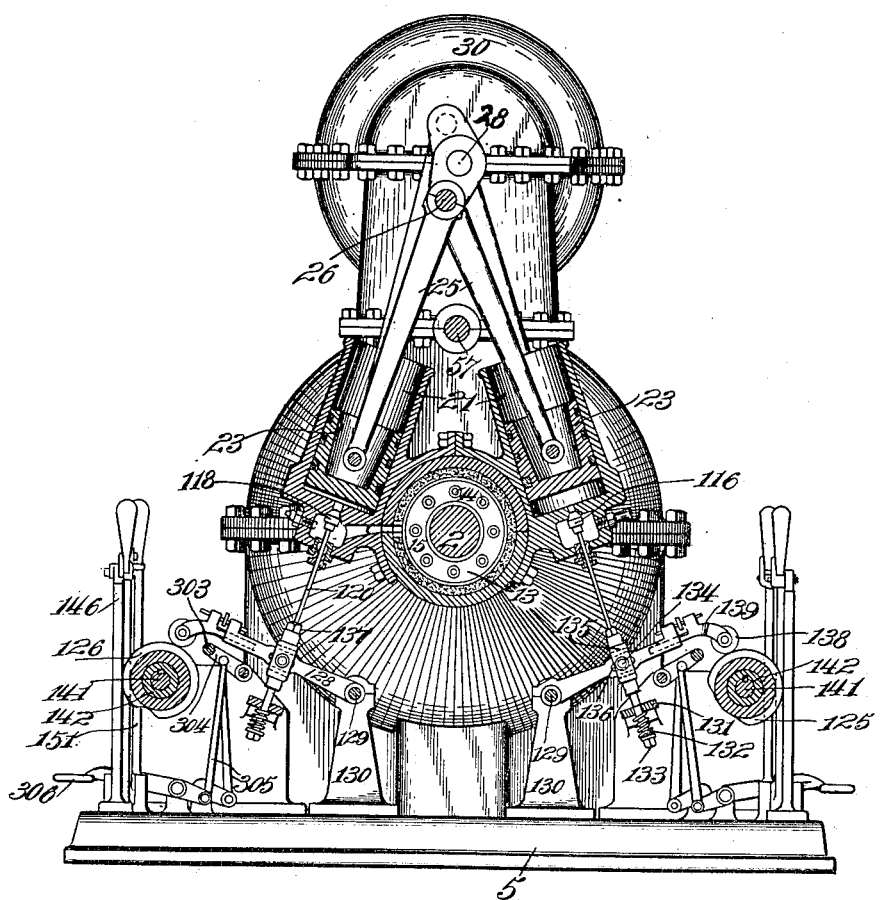

In the drawings, Figure 1 is mainly a longitudinal section, the plane of the section coinciding with the axis of the main driving-shaft. Fig. 2 is a section on the plane of the line 2 2 in Fig. 1 looking in the direction of the arrow adjacent to that line. Fig. 3 is a section on the plane of the line 3 3 in Fig. 1 looking in the direction of the arrow adjacent to that line. Fig. 4 is an enlarged detail view of a valve-plate and the means for actuating the same, this valve controlling by its movement the ingress of motive fluid, the period of compression, and the exhaust from the compression-cylinder with which it is combined. Fig. 5 is an elevational view representing the rotary element of the particular form of turbine indicated in the preceding views, only one row of wings or projections on such element, however, being indicated, the change in angular direction of such projections occurring progressively from the smaller to the larger end of the element. Fig. 6 is a sectional view illustrating a modified form of rotary compressor for delivering a continuous supply to the combustion-chamber. Fig. 7 illustrates, partly in section and partly in elevation, the rotary compressor of Fig. 6, together with the induction and eduction system connected therewith. Fig. 8 is a longitudinal sectional view, upon a somewhat larger scale, of the back-firing-preventer device indicated in Fig. 7. Fig. 9 is a combined sectional and diagrammatic view illustrating an organization somewhat different from that described with reference to the preceding figures, a parallel-flow turbine of the disk type constituting the translating device of the organization. Fig. 10 is a side elevation of an embodiment of the invention in which, as before, the products of combustion of a combustible gaseous mixture are adapted to drive the conical turbine, hereinbefore illustrated, the embodiment set forth in Fig. 10 comprising as one of its features a plurality of cylinders each one of which is convertible (by a proper manipulation of suitable controlling-valves) from a compressor into an engine, and vice versa. Fig. 11 is a sectional view on the plane of the line 11 11 in Fig. 10 looking in the direction of the arrow adjacent to that line. Fig. 12 is an enlarged sectional view taken longitudinally of the driving-shaft and showing the valve system at the bottom of one of the interconvertible compression and engine cylinders. Fig. 13 is an enlarged detail vew of one of the valve-stem-actuating levers, illustrating means for adjusting the effective length of the lever. Fig. 14 is a cross-sectional view of such lever. Fig. 15 is a detail view illustrating the manner in which a valve-stem is connected with the valve-head or valve proper. Fig. 16 shows the three cams that operate the pump element when used as an engine, also showing diagrammatically the operations thereof. Fig. 17 shows the three cams operating the pumping element when used as a compressor, with a diagram showing the operation; and Fig. 18 shows the three cams that operate the pump element when used merely to pump air into the turbine, with a diagram showing the operation.

Similar characters of reference designate corresponding parts in all figures.

In a general way the present invention may be said to include a turbine adapted to use as a motive fluid the products of combustion of a combustible gaseous mixture and means for supplying thereto one or more streams of the gaseous products which by their action and reaction against the movable and fixed blades of the turbine cause the rotation of the rotary element of the latter, and hence of the main or turbine shaft. Suitable devices are provided for compressing the combustible material and for forcing the compressed gases into a combustion-chamber, from which the resultant products pass through suitable discharge-orifices to the turbine.

Referring at the outset to the specific organization illustrated in Figs. 1 and 5, inclusive, 2 designates a suitable main shaft supported by standards 3 and 4, rising from a base-plate 5. Owing to the high speed at which this main or turbine shaft 2 is designed to run, it is advisable to so mount the latter as to permit of a slight lateral play, and thus permit free rotation of the shaft, even though the shaft and the parts secured thereto be not in perfect balance. The mounting indicated is one that has been adapted for this purpose. Each journal portion of the shaft is encircled by a series of disks 6, alternate disks being of somewhat less external diameter than the diameter of the opening in the standard in which it fits and having the diameter of its bore (through which the shaft extends) substantially the same as that of the shaft, while the intermediate disks have an external diameter substantially equal to that of the opening in the standard and a bore diameter somewhat greater than that of the journal portion of the shaft. Such a journal-mounting will permit a slight lateral play of the shaft, while preventing the escape of the gases longitudinally of the shaft. A flywheel 7 may also be secured to the shaft. Extending between the standards 3 and 4 is a conical casing 8, constituting the fixed element of the turbine whose movable element consists of a cone 9, (preferably hollow and provided with end heads 10 and 11, respectively, and an intermediate support 12,) secured to the shaft. The angle of the conical rotary element is somewhat different from the angle of the interior conical surface of the fixed element—that is to say, the latter is somewhat less tapering than the former—thus forming increasing cross-sectional space between the contiguous surfaces of the two elements from the smaller toward the larger end of the fixed cone. Adjacent to the smaller end of the cone is located the combustion-chamber 13, from which the products of combustion pass through orifices 14 in an orifice-plate 15 to the annular space between the contiguous conical surfaces aforesaid, while adjacent to the opposite end of the cone is the exhaust-chamber 16, which preferably increases in cross-sectional area from a point farthest away from the exhaust-outlet 17 toward the latter. Extending inwardly from the inner surface of the fixed part 8 of the turbine are suitable wings or projections 18, disposed in circular rows the planes of which are transverse to the axis and between which wings are located respective rows of vanes 19, extending outwardly from the conical surface of the rotary part 9. Successive rows of fixed and movable vanes are disposed at an angle to each other, which angle changes from the smaller to the larger end of the rotary element. It is apparent, moreover, that the velocity of the vanes at the exhausting end of the cone, assuming the angular velocity of the shaft to remain constant, is greater than that of those nearer the smaller end. The increasing annular space, in conjunction with the increased velocity aforesaid, provides an expansion-space for increase in volume of the motive fluid as it approaches the exhaust-outlet. The interior of the combustion-chamber is provided with an incombustible lining 20 and is fed with a compressed gaseous mixture by suitable means. The compressing means provided in the figures now being described comprises a pair of compression-cylinders 21 21, mounted upon respective brackets 22 22, extending from the framing of the mechanism and each having a trunk-piston 23, to a cross-pin 24 of which is journaled a connecting-rod 25, driven from a corresponding crank-pin 26, extending between crank-disks 27, secured to a shaft 28. One of the ends of this shaft is journaled in an upright 29, while the other end is supported by a gear-casing 30, the contents of which will hereinafter be described. The two compression-cylinders are arranged at an angle to each other, and each is provided adjacent to its bottom with a port 31, leading to a carbureter 32. Each port 31 is controlled by a valve-plate 33, which in one position opens communication through the port 34 between the carbureter and the space below the ascending piston as the piston descends. The valve having been shifted, the charge is compressed and ultimately passes to the combustion-chamber by way of port 35. This action on the part of each cylinder continues during the running of the apparatus. The valve-plate 33 may be operated in any suitable manner, the means here shown for the purpose comprising a lever 36, pivoted intermediate its ends to a fixed bracket 37, and engaging at one end by means of a forked construction 38 with a cross-pin 39 on the valve, while at its opposite end the lever is provided with a roller 40, bearing against a cam 41, secured to a cam-shaft 42. A spring 43 insures the engagement of the roller with the cam. The cam-shaft 42 is driven from the aforesaid shaft 28 by means of a bevel-gear 43, secured to the latter shaft and driving, through a corresponding bevel-wheel 44, an intermediate shaft 45, mounted in bearings 46 46 and transmitting motion to the associated cam-shaft by means of the pair of bevel-gears 47 and 48. The carbureter 32 may be of any suitable construction and is provided with a fuel-intake 49 and an air-intake 50, and of course suitable controlling-valves will be inserted where required. I have shown means for preheating the mixture before the latter passes to the compression-cylinder, this being accomplished by leading the exhaust or a portion of it from the turbine through a pipe 51 to the carbureter, from one side to the other of which it passes by means of a number of communicating pipes 52, exhaust finally taking place to the atmosphere through a conduit 53, which enters an exhaust-pipe 54. For the purpose of varying the speed or rate at which delivery of the compressed air and gases is made to the turbine a speed-changing mechanism may constitute one of the features or elements of the organization. In this instance the speed-changing mechanism is located in the gear-case 30, already mentioned, and is operated from the turbine-shaft 2 in the following manner: Secured to this shaft 2 is a gear-wheel 55, meshing with a gear 56, secured to a shaft 57, mounted in the upright 29 and the sides of the said casing. This latter is mounted on the fixed element of the turbine, and within the same is located a stepped series of gears, designated without discrimination by 58, and secured to the shaft 57. Meshing with the series of gears 58 is a reciprocal series 59, each comprising a gear-ring 60. A friction-clutch is associated with each gear-ring, the clutch construction illustrated comprising a set of resilient friction-segments 61, upon the exterior surface of which each gear-ring 60 may run loosely when the clutch is in its inoperative or "off" position. For the purpose of shifting the clutch to its operative position, and thereby rigidly securing the gear-ring to the transmitting-shaft 28, the ends of each clutch-segment 61 are pivotally connected with levers 62 62, each having an eccentric journal portion adjacent to its pivotal connection with a flanged collar 63 and the eccentric portion of one lever bearing against the eccentric portion of a contiguous lever. Each pair of the said levers bears against a corresponding pin 64, whose inner end projects into the bore of the hollow extension 65 of the transmitting-shaft 28. In order to thrust outward all the pins 64, which thus serve to connect a flanged collar rigidly with the gear-ring mounted upon it, a plunger 66, mounted to slide in the bore of the extension of the transmitting-shaft, has at each end a conical face, which by the actuation of the operating-bar 67, rigid with the plunger, wedges any desired set of pins outwardly and operates a clutch in the manner described. The operating-bar 67 is manually shiftable by suitable means, here shown to consist of a pivoted lever 68, connected by a link 69 with the bar 67 (the latter being guided in a bracket 70) and which lever may be shifted to engage its spring-pressed latch 71 with that notch in the notched sector 72 corresponding to the position which the plunger 66 should assume to hold "on" the desired clutch.

In starting up the engine a hand-crank may be temporarily connected with the squared end 73 of the transmitting-shaft 28, the lever 68 having been previously adjusted to a position in which the gears 59 are disconnected from the transmitting-shaft. The latter upon being turned operates to compress the mixed air and fuel charges, forcing the same into the combustion-chamber, from which after combustion the products of combustion pass to and actuate the turbine.

Any of the means well known in the art may be utilized for effecting the combustion of the mixture—that is to say, an ignition device may be combined with the apparatus to fire the mixture, or the compression may be carried sufficiently high to obtain a temperature adequate for combustion, or, again, the heat of the combustion-chamber after the temperature thereof has been raised to the necessary degree may be utilized for firing the mixture.

When single-acting compression-cylinders are used for compressing the mixture, the latter is delivered in the form of charges more or less intermittently to the combustion-chamber. As a modified construction I may employ a continuously-operating compression device. This is especially desirable when it is contemplated that the mixture shall be delivered in a constant stream to the combustion-chamber—for instance, when a continuously-burning mixture is used in the engine. Such a continuously-operating compression device may consist of a rotary compressor, such as indicated in a general way in Figs. 6 and 7, in which 74 designates a casing within which is mounted a pair of recessed rolls 75 and 76, geared together by gears 77 77, the former of the two rolls being secured to the transmitting-shaft 28. It is not deemed necessary to further describe the construction of this compressor, since it may be of any of those well known in the arts. Suffice it here to say that 78 is the induction-pipe leading to the compression device, the same being interposed between the latter and the carbureter 32, while the outlet 79 from the compressor leads to a combustion-chamber 13 through an interposed back-fire preventer 80, preferably placed close to the said combustion-chamber. In the construction illustrated this back-fire preventer comprises heads 81 81, a connecting-shell 82, a series of disks 83 of material, such as asbestos, held in position by opposed sheets 84 of gauze, the various parts being held in proper position by separating-rings 85.

In Fig. 9 a turbine of the disk type is indicated, and the conventional illustration which that figure depicts also discloses a system for automatically controlling the supply of compressed air and the fuel to the combustion-chamber. As before, 2 designates the turbine or main shaft provided with bearings 86 86, whose construction is substantially like the bearings described with reference to the shaft in the preceding figures. The turbine is designated in a general way by 87, the same comprising a plurality of rotary disks 88, secured to the turbine-shaft and provided with wings or projections 89, these disks being located between fixed disk-like parts 90, provided with wings or projections 91. The parts 90 are secured within the turbine-casing 92, and the various wings or projections are disposed at a proper angle to each other to cause, through the effect of action and reaction, the rotation of the rotary disks and the shaft to which they are attached, while the radial depth of the wings from the inlet end of the turbine to the exhaust end thereof may be increased to obtain a gradual increase of the expansion-space. The exhaust-space is, as before, designated by 16, while 17 likewise indicates the exhaust-opening from the turbine-casing. The combustion-chamber 93 may be provided with a heat-resisting lining 94. A worm-gear 95 on the shaft 2 meshes with a worm-wheel 96, which serves to drive, through a connecting-rod 97, a compressor 98, which delivers air through a conduit 99 to an air-tank 100. Air for the combustion of the fuel in the combustion-chamber passes through a conduit 101, provided with a pressure-gage 102 and a shut-off valve 103, the connection of this conduit with the combustion-chamber being made by means of a mixing-head 104. From the fuel-tank 105 a conduit 106 leads to said mixing-head 104, a shut-off valve 107 being provided in this conduit, while the pressure in the fuel-tank is indicated by a gage 108. For the purpose of automatically regulating the supply of fuel and compressed air to the combustion-chamber I have indicated suitable pressure-regulating devices controlled in their operation by the changes in pressure occurring in the combustion-chamber, with the result that as the pressure therein lowers the throttling of the air and fuel supply grows less in amount, and a greater quantity of the two fluids is permitted to pass to the chamber. Conversely, the rise of pressure within the chamber above that at which it is designed that it shall be maintained operates to cut off the supply of the two fluids. In the organization illustrated a pressure-regulating valve 109 is interposed in the conduit 101, the controlling-pressue of the combustion-chamber contents having entrance to the regulator by means of a conduit 110, connecting with the conduit 111, leading from the combustion-chamber. A shut-off valve is designated by 112. Similarly, a pressure-regulating valve 113 is interposed in the fuel-supply conduit 106, this regulating-valve being opened to the pressure within the combustion-chamber through the said conduit 111. A pressure-gage 114 indicates the pressure within the combustion-chamber. The products of combustion within the chamber pass directly to the turbine through a port 214, provided with a shut-off valve 115. No specific description of these regulating-valves is deemed necessary, since they may be any of those well known in the arts and adapted to the purpose.

In the remaining figures of the drawings there is set forth an organization comprising a set of interconvertible compressors and engine-cylinders, with which there is combined means for bringing the parts into such relation as to enable any one cylinder to be run either as an explosive-engine or as a compressor, or, on the other hand, permit the cylinder to run idle. Such a capacity is particularly suited for starting the turbine in motion, since one or more of the cylinders may be run as engines for the purpose of setting in motion and speeding up the rotary part of the turbine, (the remaining cylinders running idle,) after which the cylinders may be in succession converted into compressors, whereby the work put upon the motor is gradually increased, and at the same time the quantity of compressed air necessary to supply the fuel with the proper quantity of air is increased. In the organization illustrated two sets of two cylinders each are indicated, the two sets being disposed at an angle to each other and being located upon opposite sides of the turbine-shaft. Since in the present instance the construction of one set is substantially identical with that of the other, it will be understood that the description of one applies to the other. Furthermore, the turbine, turbine-shaft, change-gears, shafts comprised therein, mounting, &c., being substantially like the corresponding parts described with reference to Figs. 1 to 9 no further description of these parts will be given, parts in Figs. 10 and 11 having the same designating characters applied to them as analogous parts in the first figures of the drawings. Each cylinder 300 of the pair at each side is provided with a set of three valves—a valve 116, controlling the entrance of the air; a valve 117, that of the fuel, and a valve 118, that of the exhaust to the combustion-chamber. Each of these valves is provided with a corresponding stem 120, which is grooved at 121 to receive one or more pins 122 to thereby enable the valve to rotate with reference to the stem and permit it to change its relation with reference to its seat for the purpose of minimizing any tendency to uneven wearing of the valve-surface. A stuffing-box 123 incloses the stem of each valve. The valve 116 is worked from a cam 124, the valve 117 from a cam 125, and the valve 118 from a cam 126. The connection between each valve, stem and its corresponding cam is had through a lever, (there being a separate lever for each cam and its associated valve-stem.) These levers are of a conformation such that they will properly coöperate at one end with the corresponding cam, while intermediate its ends the lever is connected with its valve-stem. The levers are designated without discrimination by 128, all the levers at one side being pivotally mounted on a shaft 129, extending between standards 130 and similarly at the other side. A prolongation of each valve-stem is guided by a guide-plate 131 through perforations in which the valve-stems pass, while each prolongation has a spring 132 inserted between a head 133 and the guide-plate. Cross-pins 134 pass transversely through slotted members 135, secured to the respective stems, and engage with the walls of respective slots 136 in the levers. Each valve-stem may be provided with a nut 137 for adjusting the position of the slotted block on the stem, while the spring associated with the latter insures the engagement of a cam-roll 138 at the end of the lever with the particular cam which serves to control it. The roller is preferably mounted on a part 139, adjustable, as by a right and left hand screw 140, with reference to the body of the lever in order to effect an adjustment of the cam-roll with respect to the cam.

The cams controlling the valves of one cylinder are adjustable longitudinally of the axis of a shaft 141 independently of the valves for the other cylinder at that side. This may be effected by the following construction: One set of cams (that at the right in Fig. 10) is secured to a sleeve 142, adjustable axially of the shaft 141, but compelled to rotate therewith by a pin or feather and slot connection. (Not shown.) The set of cams at the left in Fig. 10, however, are secured directly to the shaft 141, which is longitudinally movable in a bearing 143, and the hub of a bevel-gear 144, (with which it has feather-and-slot connection,) this bevel-gear being mounted in an upright 145. Longitudinal adjustment of the sleeve 142 is effected through the shifting of a lever 146, provided with a slot 147, into which projects a pin 301, extending from ring loosely mounted in a collar 148, rigid with the sleeve, the lever being provided with a latch 149, adapted to engage with notches in a locking-bar 150, erected from the supporting-base of the apparatus. Similarly a lever 151 is provided with a slot 152, into which projects a pin 302, extending from a ring loosely mounted in a collar 153 of the shaft 141. This lever carries a latch 154, adapted to engage with any one of the notches provided for it in said locking-bar.

It being advisable to disengage the cam-rollers from the set of cams before shifting the same, means are provided for lifting prior to the movement of the adjusting-lever the rollers from the cams. Adapted to bear against the under side of the roller-carrying levers of each set is the swinging bar 303 of a corresponding pivoted frame 304, which is connected by links 305 with a pivoted foot-lever 306.

Motion is transmitted to the bevel-gear 144 on the shaft 141 through a companion bevel-gear 156, secured to a shaft 157, driven through bevel-gears 158 159, the latter being secured to a shaft 160, driven from the shaft 28 of the apparatus.

Each connecting-rod 25 is jointed to a proper crank on the shaft 28, and the latter may be provided with a fly-wheel 162, which may be engaged with and disengaged from the shaft by means of the clutch-operating lever.

Each of the cams 124, 125, and 126 has three different portions that engage with its coöperating roller 138 in its respective three positions. The three portions of the first cam are designated 224, 324, and 424, the parts of the intermediate cam are designated 225, 325, and 425, and the three parts of the third cam are designated 226, 326, and 426. These cams are shown in Figs. 16, 17, and 18 in connection with diagrams of their respective functions. When the shaft or collar carrying these cams is in one position—for instance, the position in which shown to the left in Fig. 10—the three rollers 138 will engage the cams 224, 225, and 226, respectively, and thereby operate the valves 116, 117, and 118, respectively. The driving connection between the shaft 28 and the cam-shaft is such that the latter makes one revolution to two of the driving-shaft. Hence for one revolution of the cam the pistons will each make two complete reciprocations, corresponding to four cycles. Referring now to Fig. 16, during the first cycle or upward movement of the piston the cam 224 will move through the first quarter of a revolution. In this figure the normal position of the roller 138, holding the valve closed, is represented by a circle in full lines, while the circle in broken lines represents the position it will assume by reason of a depression of the cam, thereby permitting opening the valve coöperating with such roller. During this first quarter of a revolution (designated by a) it will be seen that the roller depresses and opens the valve 116, thereby admitting air to the cylinder, which will be drawn in by reason of the piston ascending and creating a vacuum. During this quarter movement the roller 138, connected with the valve 117 and engaging the cam 225, will be depressed through a small portion of this movement of the cam, which will therefore admit of fuel being drawn in during a portion of said movement. This depression is shown considerably less than the whole of this quarter movement for the purpose of obtaining a proper mixture of air and fuel. This proportion can be arranged as preferred, and it is found convenient to open the fuel-valve for about one-eighth of the time that the air-valve is opened. This movement of the piston is represented by the first incline of the diagram in this figure. The second cycle, in which the piston moves downwardly, is represented by the second incline of the diagram, during which time the cam will move through the second quarter of a revolution, (designated by b.) It will be observed that the periphery of both of the cams 224 and 225 contain no depression during this second quarter—that is, the rollers 138 will be held in position to retain the valves closed. As the piston descends it will therefore compress the mixture of air and fuel in the cylinder. It is necessary to explode this mixture at about this stage of the operation, and it may take place just before the end of the second cycle. This may be accomplished by means of a spark-plug 171, operated by any of the well-known forms of commutator. (Not shown.) The third cycle (indicated by the third incline of the diagram) is that of expansion by the exploded gases in the cylinder, by which means the piston is driven upward. During this third quarter c of the cam movement it will be seen that the cams 224 and 225 continue to hold the valves 115 and 117 closed; but the third cam, 226, that during the first and second quarter movements engaged its coöperating roller 138 to hold the valve 118 closed, now during the third quarter movement of this cam will allow the valve to open, preferably at the latter part of its movement, whereby the expanding gases will be permitted to pass into the combustion-chamber 15, and consequently to act on the vanes of the turbine. In the fourth and last cycle d the cams 225 and 226 will act on their engaging rollers 138 to retain the valves 117 and 118 closed; but during this movement cam 224 by reason of its depression will permit valve 116 to open, and since the piston is descending the gases in the cylinder will be exhausted to the atmosphere through the air-admission port of this valve. From this it will be understood that the cylinder will act as an ordinary four-cycle explosive-engine, which will not only serve through the change-gear system to positively drive the turbine, but the exhaust from the cylinder will also tend to rotate the turbine by reason of the expanding gases being admitted to the turbine to act thereon during the latter part of the active or expansion stroke of the piston.

After the turbine has been speeded up to a certain rate the lever 149 is shifted to a middle position, throwing the cams just referred to out of engaging position with the three rollers 138 and bringing the latter into engagement with the three cams 324, 325, and 326. (Shown in Fig. 17.) The operation of these cams is as follows: During the first cycle or quarter-turn it will be seen that the roller 138 is depressed to open the valve 116, thus admitting air under the ascending piston, and the roller engaging the cam 325 is also depressed to admit fuel to the cylinder under the piston. The construction of these cams for the first quarter of their periphery is identical with the cams 224 and 225, whereby the proper mixture of air and fuel will be drawn into the cylinder during the ascent of the piston. At the second cycle the cams 324 and 325 will hold the valves 116 and 117 closed; but on the engaging portion of the cam 326 is a depression at the lower part thereof that will permit the valve 118 to open during the latter portions of the second cycle. The result of this will be that during the descent of the piston for the larger part of its movement the mixture will be highly compressed until the valve 118 opens, whereupon this compressed mixture will be ejected into the explosive chamber 15 of the turbine. This will cause the piston and cylinder to perform the function of a compressor by the mere act of shifting the cams 224, 225, and 226 out of engagement with the three rollers and shifting the cams 324, 325, and 326 into position to engage these rollers In other words, the device is converted from a prime mover or engine into a force-pump or compressor, or vice versa, by the mere shifting of the shaft carrying these three cams. When the mechanism operates as a compressor, the ignition apparatus is thrown out of operation. The cylinder and piston with the three valves can also be caused to act to pump or force air alone into the combustion-chamber and turbine, when it is desired to do so, for the purpose of cleaning the same by further shifting the cam-carrying shaft and bringing the three rollers into engagement with the cams 424, 425, and 426. (Shown in Fig. 18.) The cam 425 has a continuous surface that will coöperate with the roller connected with the valve 117 to keep this valve closed, as it is not necessary to admit any fuel at this operation. The cam 424 serves to open the valve 116 during the first cycle, during which time the cam 426 holds the valve 118 closed. During the next cycle these conditions are reversed, valve 116 being closed and valve 118 open, whereby the air drawn into the cylinder on the ascent of the piston will now be forced into the combustion-chamber and turbine during the descent of the piston. The next two cycles may be similarly arranged, air being drawn in at the third cycle and forced into the combustion-chamber during the fourth.

There being four separate cylinders, each having its set of three valves with the means for causing the cylinders to perform either of the three functions above described, these may be caused to all act as prime movers or engines or to all operate as compressors, as desired. It has been found convenient to operate one or two of such elements as an engine, while the others operate as compressors during the starting of the turbine, and when sufficient speed is attained the levers are shifted to cause all of the elements to act as compressors, which is their principal function.

Having thus described my invention, I claim—

1. The combination of an explosive-engine, a pumping element operatively connected with the engine-shaft, an adjusting device, arranged to cause the pumping element to act as an explosive-engine and drive the engine-shaft when said device is in one position, and when said device is shifted to another position to cause the pumping element to feed the mixture to the engine, and when said adjusting device is shifted to a third position to cause the pumping element to pump atmospheric air into the engine.

2. The combination of an explosive-engine, a pumping element normally connected with the shaft of the engine, an adjusting device, means arranged to cause the pumping element to feed explosive mixture to the engine when said device is in one position, and when said device is in another position to cause the pumping element to operate as an explosive-engine and means for causing the gases operating said element to act on said explosive-engine.

3. The combination of an explosive-engine, a pumping element operatively connected with the shaft of the engine, a set of valves for the pumping element, a set of cams actuated from the engine-shaft and arranged to operate said valves to cause the pumping element to feed explosive mixture to the engine, a set of cams actuated from the engine-shaft and arranged to cause the pumping element to operate as a prime mover and thereby drive the engine-shaft, and means for shifting the sets of cams into position to operate the valves.

4. The combination of an explosive-engine, a pumping element operatively connected with the shaft of the engine, a set of valves for the pumping element, a set of cams actuated from the engine-shaft and arranged to operate said valves to cause the pumping element to feed explosive mixture to the engine, a second set of cams actuated from the engine-shaft, and arranged to cause the pumping element to operate as a prime mover and thereby drive the engine-shaft, a third set of cams actuated from the engine-shaft and arranged to operate said valves to cause the pumping element to feed air to said explosive-engine, and means for shifting the sets of cams to bring them into position to operate the valves.

5. The combination of an explosive-engine, a pumping element, an adjustable device, means arranged to cause the pumping element to act as a prime mover and drive the engine-shaft when said device is in one position, and when said device is shifted to another position to cause the pumping element to feed explosive mixture to the engine, a fly-wheel, and means for connecting and disconnecting the fly-wheel with the pumping element.

6. The combination of an explosive-engine, a pumping element, a clutch device operatively connecting such element with the engine-shaft, a fly-wheel arranged to be connected with the pumping element by the clutch device, an adjusting device, and means arranged to cause the pumping element to act as a prime mover and drive the engine-shaft when such device is in one position, and when such device is shifted to another position to cause the pumping element to feed explosive mixture to the engine.

7. The combination of an explosive-engine, a pumping element operatively connected with the shaft of the engine, a set of valves for the pumping element, a set of cams actuated from the engine-shaft and arranged to operate said valves to cause the pumping element to feed explosive mixture to the engine, a set of cams actuated from the engine-shaft and arranged to cause the pumping element to operate as an explosive-engine and thereby drive the engine-shaft, and means for shifting the sets of cams into position to operate the valves.

8. The combination of an explosive-engine, a pumping element operatively connected with the shaft of the engine, a set of valves for the pumping element, a second shaft connected from the engine-shaft, a set of cams on the second shaft arranged to operate said valves and cause the pumping element to feed explosive mixture to the engine, a second set of cams on the second shaft arranged to cause the pumping element to operate as an explosive-engine and drive said engine-shaft, a third set of cams on said second shaft arranged to operate said valves to cause the pumping element to feed air to said explosive-engine, and means for shifting the second shaft to bring the said sets of cams alternately into position to operate the valves.

9. The combination of an explosive-engine, a pumping element operatively connected with the engine-shaft, an adjusting device, and means arranged to cause the pumping element to act as an explosive-engine and drive the engine-shaft when said device is in one position, and when said device is shifted to another position to cause the pumping element to feed explosive mixture to the engine.

10. The combination of an explosive-engine, a pumping element operatively connected with the shaft of the engine, a set of valves for the pumping element, means for operating said valves from the engine-shaft to cause the pumping element to feed explosive mixture to the engine, and an adjusting member coöperating with said valves and arranged to cause the pumping element to operate as an explosive-engine and thereby drive the engine-shaft.

11. The combination of an explosive turbine-engine, a pumping element operatively connected with the engine-shaft, an adjusting device, and means arranged to cause the pumping element to act as an explosive-engine and drive the engine-shaft when said device is in one position, and when said device is shifted to another position to cause the pumping element to feed explosive mixture to the engine.

12. The combination of an explosive-engine, a plurality of pumping elements each operatively connected with the engine-shaft, an adjusting device for each element, and means for each element arranged to cause it to act as an explosive-engine and drive the engine-shaft when its coöperating adjusting device is in one position, and when such device is shifted to another position to cause the pumping element to feed the mixture to the explosive-engine.

13. The combination of an explosive-engine, a pumping element operatively connected with the shaft of the engine, a set of valves for the pumping element, cams actuated from the engine-shaft arranged to operate said valves to cause the pumping element to feed explosive mixture to the engine, and an adjusting member arranged to shift said cams and operate the valves to cause the pumping element to operate as an explosive-engine, and thereby drive the engine-shaft.

14. The combination of an explosive-engine, a pumping element, a clutch device operatively connecting such element with the engine-shaft, an adjusting device, and means arranged to cause the pumping element to act as an explosive-engine and drive the engine shaft when said device is in one position, and when said device is shifted to another position to cause the pumping element to feed explosive mixture to the engine.

15. The combination of an explosive-engine, a pumping element, a speed-changing device operatively connecting such element with the engine-shaft, an adjusting device, and means arranged to cause the pumping element to act as an explosive-engine and drive the engine-shaft when such device is in one position, and when such device is shifted to another position, to cause the pumping element to feed explosive mixture to the engine.

16. The combination of an explosive-engine, a pumping element, a clutch-operated speed-changing device operatively connecting such element with the engine-shaft, an adjusting device, and means arranged to cause the pumping element to act as an explosive-engine and drive the engine-shaft when said device is in one position, and when said device is shifted to another position to cause the pumping element to feed explosive mixture to the engine.

Signed at Nos. 9 to 15 Murray street, New York, N. Y., this 8th day of March, 1904.

HENRY F. BLACKWELL.

Witnesses:
 FRED. J. DOLE,
 JOHN O. SEIFERT.